US010444801B2

(12) United States Patent
Shindo et al.

(10) Patent No.: US 10,444,801 B2
(45) Date of Patent: Oct. 15, 2019

(54) ELECTRONIC DEVICE AND LATCHING MECHANISM

(71) Applicant: Panasonic Intellectual Property Management Co., Ltd., Osaka (JP)

(72) Inventors: Kenichi Shindo, Osaka (JP); Hitoshi Nakatani, Osaka (JP); Tatsuo Kuromoto, Osaka (JP); Futoshi Kuriyama, Saga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/957,795

(22) Filed: Apr. 19, 2018

(65) Prior Publication Data

US 2018/0239398 A1    Aug. 23, 2018

Related U.S. Application Data

(63) Continuation of application No. PCT/JP2016/003409, filed on Jul. 21, 2016.

(30) Foreign Application Priority Data

Nov. 6, 2015   (JP) ................................. 2015-218845

(51) Int. Cl.
  *G06F 1/16*    (2006.01)
  *E05B 65/00*   (2006.01)
  (Continued)

(52) U.S. Cl.
  CPC ........ *G06F 1/1679* (2013.01); *E05B 65/0067* (2013.01); *G06F 1/16* (2013.01);
  (Continued)

(58) Field of Classification Search
  CPC ................................................... G06F 1/1679
  See application file for complete search history.

(56) References Cited

U.S. PATENT DOCUMENTS 6,122,152 A * 9/2000 Goto ....................... G06F 1/162
                                                           307/116
6,125,040 A * 9/2000 Nobuchi ................. E05B 63/14
                                                          312/223.1
(Continued)

FOREIGN PATENT DOCUMENTS

| JP | H07-036569 A | 2/1995 |
| JP | 2004-326440 A | 11/2004 |
| JP | 2007-059662 A | 3/2007 |

OTHER PUBLICATIONS

International Search Report for corresponding International Application No. PCT/JP2016/003409, dated Sep. 27, 2016.

*Primary Examiner* — Binh B Tran
*Assistant Examiner* — Douglas R Burtner
(74) *Attorney, Agent, or Firm* — Renner, Otto, Boisselle & Sklar, LLP

(57) ABSTRACT

A latching mechanism includes a latch provided to a first unit, provided with a first engaging portion at its tip, and is rotatable about a rotation shaft from a first rotation position to a second rotation position, a shaft support provided to the first unit, rotatably supporting the rotation shaft, and is movable between a first position and a second position, a biasing portion provided to the first unit, and biasing the shaft support in a direction from the first position to the second position, and a second engaging portion provided to a second unit, and is engageable with the first engaging portion. The first and second engaging portions engage when the second unit is closed with respect to the first unit, the shaft support lies at the second position, and the latch lies at the second rotation position.

8 Claims, 19 Drawing Sheets

(51) Int. Cl.
*F16C 11/04* (2006.01)
*E05C 5/02* (2006.01)

(52) U.S. Cl.
CPC ........... *E05C 5/02* (2013.01); *E05Y 2900/606* (2013.01); *F16C 11/04* (2013.01); *G06F 1/1616* (2013.01)

(56) References Cited

U.S. PATENT DOCUMENTS

| | | | | |
|---|---|---|---|---|
| 7,637,540 | B2* | 12/2009 | Chiang | E05C 9/1875 292/121 |
| 2004/0184228 | A1* | 9/2004 | Minaguchi | G06F 1/1616 361/679.57 |
| 2005/0036284 | A1* | 2/2005 | Kang | E05B 63/24 361/679.58 |
| 2005/0087993 | A1* | 4/2005 | Lin | E05C 19/163 292/45 |
| 2005/0168923 | A1* | 8/2005 | Huang | G06F 1/162 361/679.59 |
| 2006/0038415 | A1* | 2/2006 | Liu | E05C 3/162 292/251.5 |
| 2006/0125585 | A1* | 6/2006 | Lo | G06F 1/1616 335/285 |
| 2006/0138784 | A1* | 6/2006 | Wang | E05C 9/1875 292/24 |
| 2008/0078217 | A1* | 4/2008 | Kumagai | G06F 1/1616 70/159 |
| 2008/0151509 | A1* | 6/2008 | Chien | G06F 1/1616 361/726 |
| 2008/0179897 | A1* | 7/2008 | Wu | E05C 19/163 292/251.5 |
| 2008/0198542 | A1* | 8/2008 | Kim | G06F 1/1616 361/679.27 |
| 2010/0053857 | A1* | 3/2010 | Zhu | E05B 15/101 361/679.01 |
| 2012/0206873 | A1* | 8/2012 | Schwager | G06F 1/162 361/679.21 |

* cited by examiner

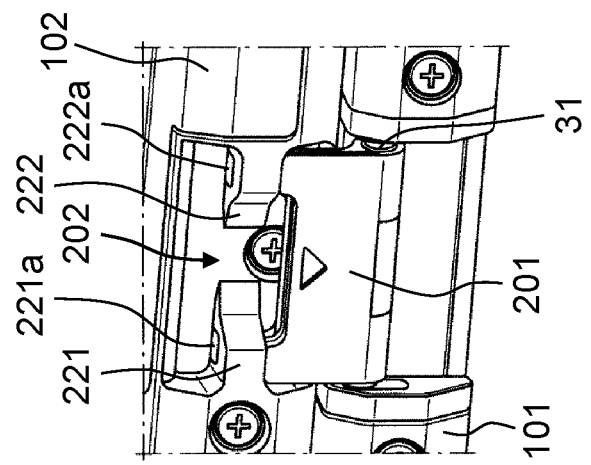
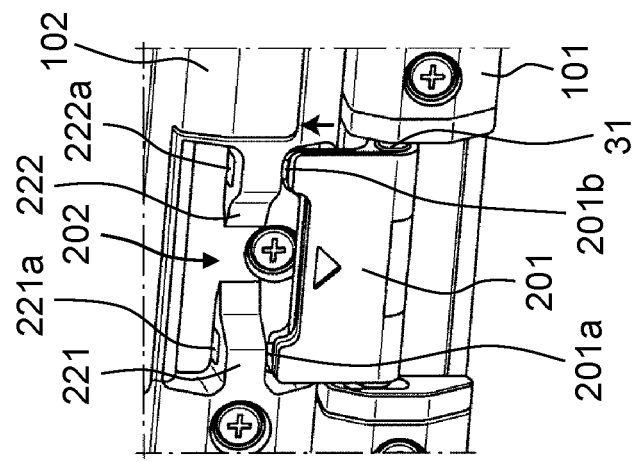
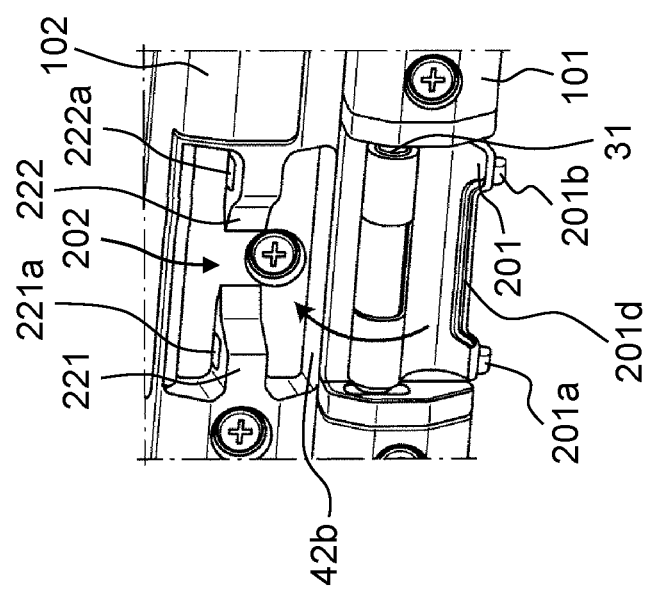

ELECTRONIC DEVICE AND LATCHING MECHANISM

BACKGROUND

1. Technical Field

The present disclosure relates to a latching mechanism and an electronic device including the latching mechanism. In the electronic device, the latching mechanism holds, with respect to a first unit, a second unit in a closed state.

2. Description of Related Art

Unexamined Japanese Patent Publication No. H07-36569 discloses an electric device including a main body, a display openably pivoted with respect to the main body, and a latching mechanism for locking the display in a closed state when the display is closed with respect to the main body. This latching mechanism includes a lock claw provided on a front end face of the main body so as to project outward, a latch revolvably attached on a front end face of the display so as to be engageable and disengageable with the lock claw, a biasing device elastically biasing the latch in a direction toward which the latch engages with the lock claw, and a locking device for prohibiting the latch disengaged from the lock claw from revolving in the above described latch locking direction. In Unexamined Japanese Patent Publication No. H07-36569, use of the locking device for preventing the latch from being locked again when the latch is released eliminates use of a pop-up spring that would lead to a large-sized, expensive device with lowered operability, and achieves a highly operable latching mechanism.

SUMMARY

The present disclosure provides a latching mechanism and an electronic device including the latching mechanism. In the electronic device, the latching mechanism holds, with respect to a first unit, a second unit in a closed state.

An aspect of the present disclosure provides, in an electronic device, a latching mechanism for fixing, with respect to a first unit, a second unit in a closed state. The latching mechanism includes a latch that is provided to a first unit, that is provided with a first engaging portion at a tip of the latch, and that is rotatable about a rotation shaft from a first rotation position to a second rotation position, a shaft support that is provided to the first unit, that rotatably supports the rotation shaft, and that is movable between a first position and a second position, a biasing portion that is provided to the first unit, and that biases the shaft support in a direction from the first position to the second position, and a second engaging portion that is provided to a second unit, and that is engageable with the first engaging portion. The first and second engaging portions engage when the second unit is closed with respect to the first unit, the shaft support lies at the second position, and the latch lies at the second rotation position.

Another aspect of the present disclosure further provides an electronic device including a first unit, a second unit openable with respect to the first unit, and the latching mechanism described above.

According to the present disclosure, a latching mechanism capable of locking and unlocking of a latch by simply performing an operation with a rotation and a vertical movement, and an electronic device including the latching mechanism can be achieved.

BRIEF DESCRIPTION OF DRAWINGS

FIG. 6A is a view illustrating an operation of the latching mechanism when the latch is to be locked;

FIG. 6B is a view illustrating the operation of the latching mechanism when the latch is to be locked;

FIG. 6C is a view illustrating the operation of the latching mechanism when the latch is to be locked;

DETAILED DESCRIPTION

Exemplary embodiments will be described herein in detail with reference to the drawings appropriately. However, detailed descriptions more than necessary might be sometimes omitted. For example, in some cases, detailed description of already well-known items and repeated description with respect to substantially the same configuration will be omitted. These omissions are made to avoid unnecessary redundancy of the following description, and to facilitate the understanding of those skilled in the art.

Note that the inventors of the present disclosure provide the accompanying drawings and the following description in order to allow those skilled in the art to fully understand the present disclosure, and do not intend to limit the subject matter as described in the appended claims.

First Exemplary Embodiment

1-1. Overall Configuration

Figure 1:
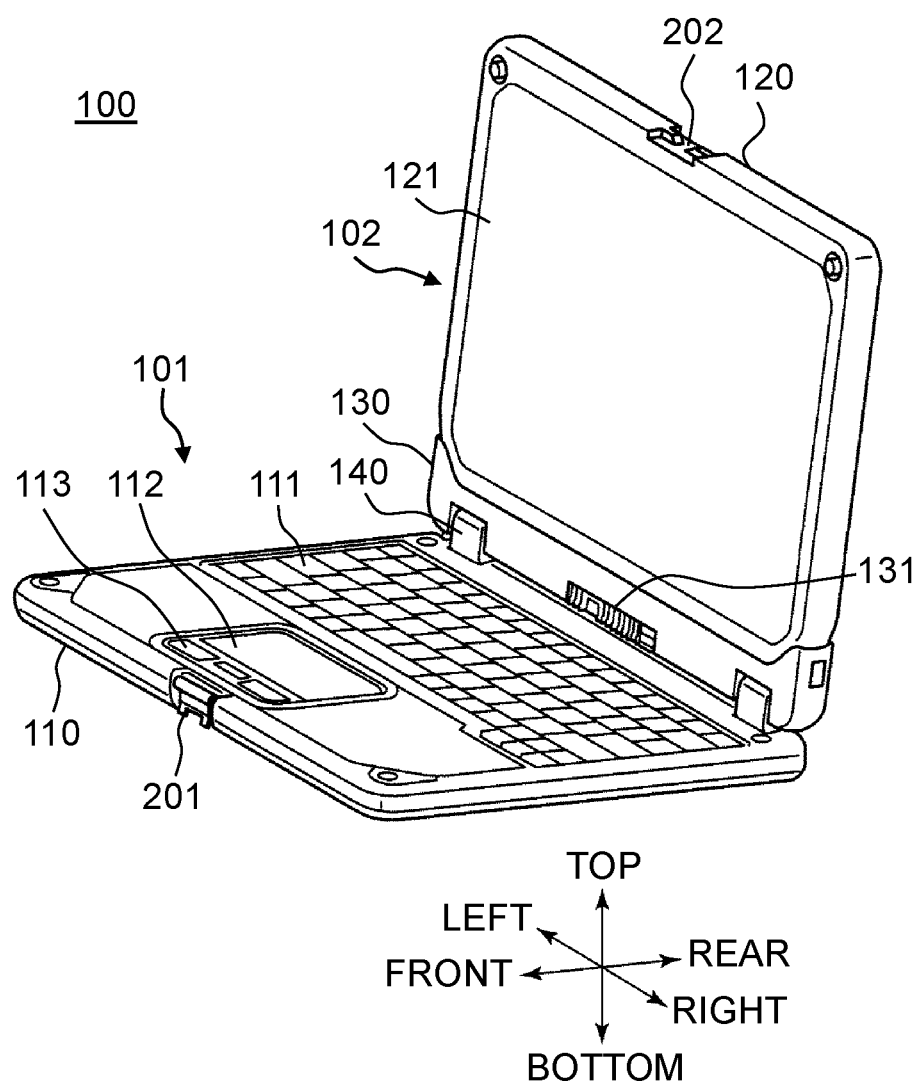
FIG. 1 is a perspective view of an information processing device according to a first exemplary embodiment of the present disclosure.

FIG. 1 is a perspective view of an information processing device representing an example of electronic device according to a first exemplary embodiment of the present disclosure. The following description appropriately uses directions shown in FIG. 1 as directions of the information processing device.

As shown in FIG. 1, information processing device 100 includes first unit 101 and second unit 102. Second unit 102 is detachable from first unit 101. When second unit 102 is attached to first unit 101, information processing device 100 can be used as a laptop computer. Second unit 102 itself can be used as a tablet computer. As described above, information processing device 100 is a so-called detachable computer.

Second unit 102 itself functions as a tablet computer. Second unit 102 includes display 121. Display 121 is formed by a liquid crystal display device, for example, and is attached to a main face of second housing 120. Display 121 may be formed by another display device such as an organic electroluminescence (EL) device. Display 121 is provided with a touch panel superimposed on the liquid crystal display device so as to be capable of accepting a touch operation of a user. To achieve functions as a computer, a central processing unit (CPU), a volatile storage device (RAM), a non-volatile storage device (e.g., ROM and SSD), a battery, and other devices are incorporated in second unit 102. The non-volatile storage device (e.g., ROM and SSD) contains, for example, an operating system (OS), various application programs, and various data. The central processing unit (CPU) reads the OS, the application programs, and the various data, and executes arithmetic processing to achieve various functions.

First unit 101 includes first housing 110, holder 130, and hinges 140. First housing 110 is formed of, for example, a metal such as a magnesium alloy or a resin. First unit 101 includes input portions with which a user performs entries for a second unit. First housing 110 is provided with the input portions including keyboard 111, touch pad 112, and operation buttons 113.

Holder 130 is electrically or mechanically connected to first unit 101. Holder 130 attaches second unit 102 by partially accommodating second unit 102. When second unit 102 is attached, holder 130 electrically connects first unit 101 and second unit 102.

Hinges 140 couple holder 130 and first unit 101 so that holder 130 (i.e., second unit 102) can revolve with respect to first unit 101.

Inside holder 130, a connector (not shown) to be connected to a connector (not shown) of the second unit is provided. Inside hinge 140, wires also pass through for exchanging various signals and electric power between holder 130 and first unit 101. Via these connectors and the wires, various signals and electric power can be exchanged between second unit 102 and first unit 101.

Figure 2:
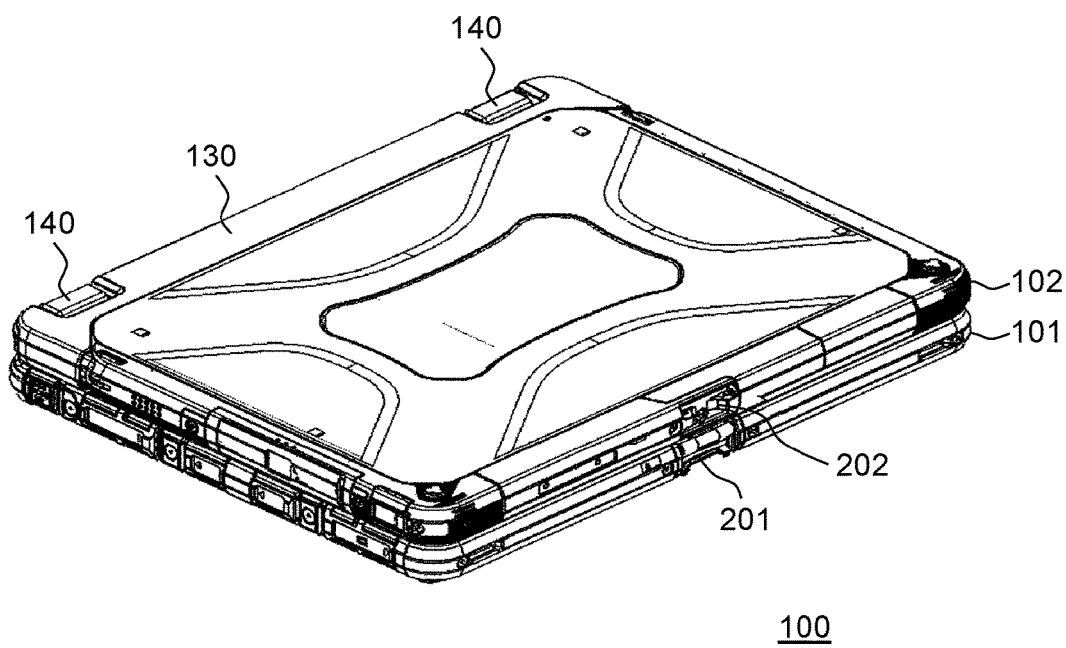
FIG. 2 is a perspective view of the information processing device when a second unit is closed with respect to first unit.

FIG. 2 is a perspective view of information processing device 100 when second unit 102 is closed with respect to first unit 101. A side of first unit 101 is provided with connection terminals for connecting a power supply plug, an external device, a memory card, and other devices. Terminal covers are provided to the connection terminals so that the connection terminals do not expose when not in use.

Similar to second unit 102, first unit 101 is provided with a connection terminal for a memory card, a connection terminal for an earphone/microphone, a high-definition multimedia interface (HDMI) (registered trademark) terminal, a universal serial bus (USB) terminal, and other terminals, for which water proof and dust proof terminal covers are respectively provided.

Information processing device 100 according to this exemplary embodiment includes a latching mechanism for holding second unit 102 in a closed state with respect to first unit 101. The latching mechanism includes latch 201 provided to first unit 101, and latch receiver 202 provided to second unit 102. Latch 201 is formed of a metallic material such as magnesium. Latch 201 is disposed at a center of a front end of first unit 101 of information processing device 100. Latch receiver 202 is provided at a center of an end of second unit 102 of information processing device 100, which faces front when second unit 102 is closed.

1-2. Latching Mechanism

1-2-1. External Configuration of Latching Mechanism

Figure 3:
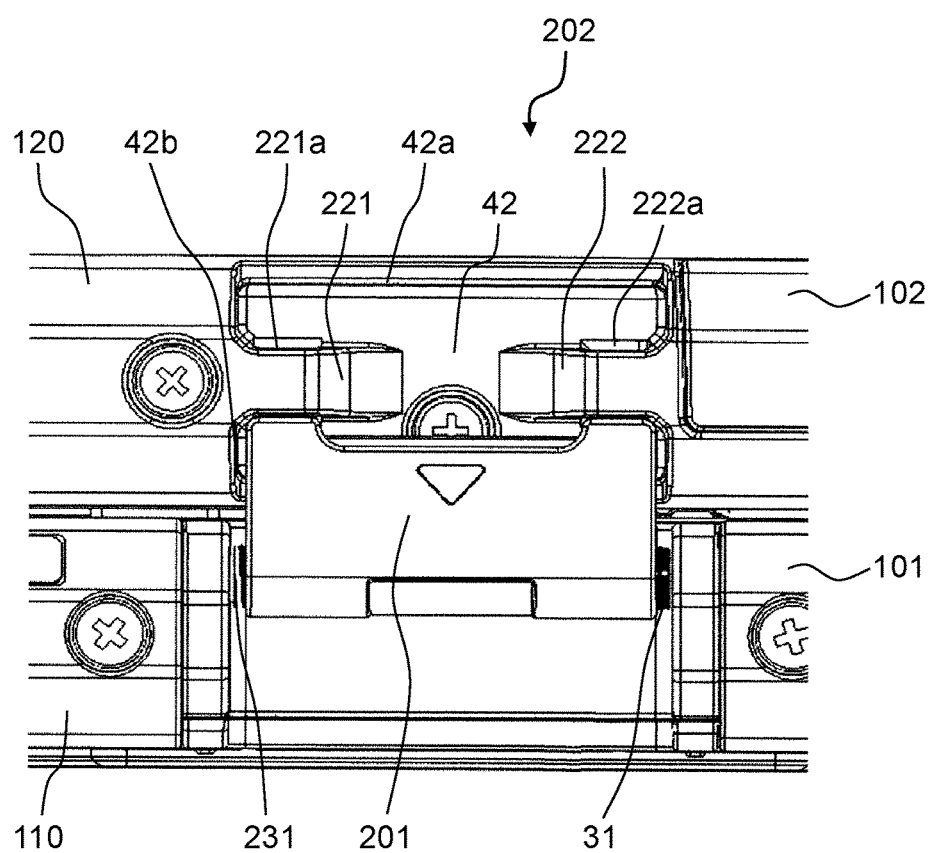
FIG. 3 is a view illustrating a latching mechanism of the information processing device when a latch is locked.
Figure 4:
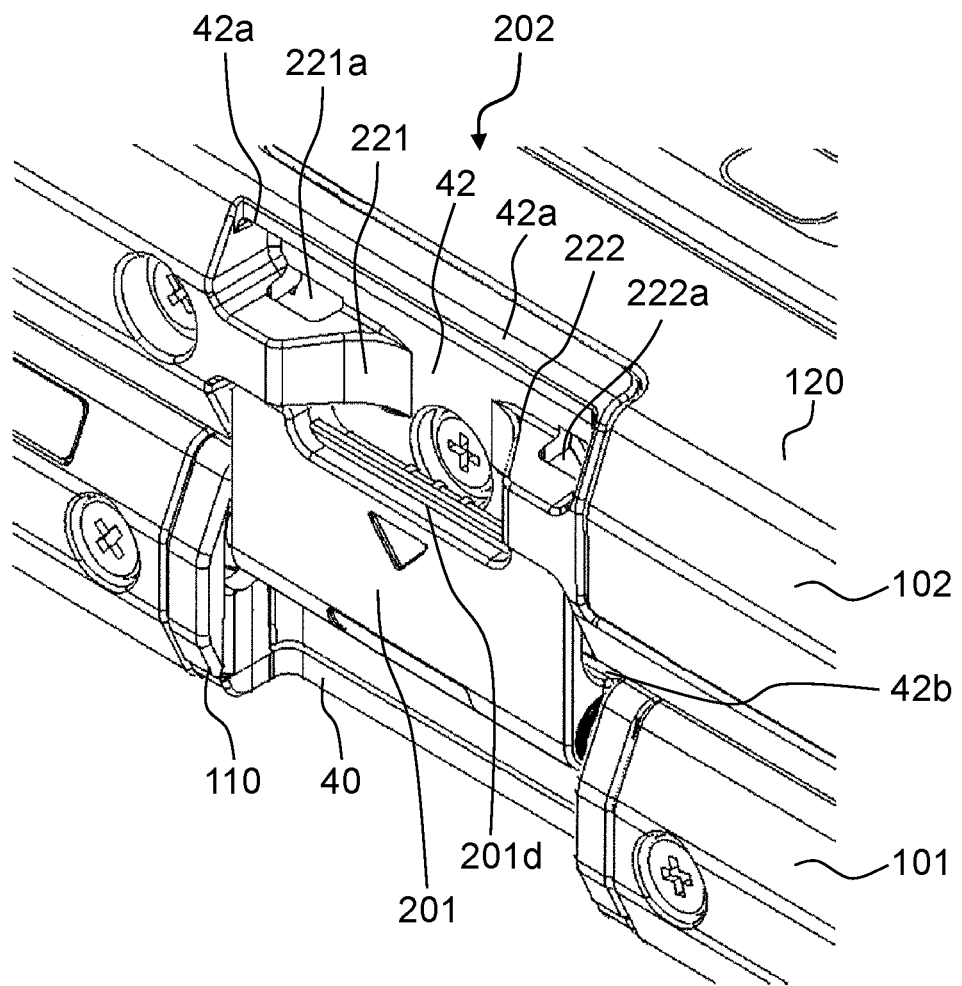
FIG. 4 is a view illustrating the latching mechanism of the information processing device when the latch is locked.

FIGS. 3, 4 are views illustrating the latching mechanism when latch 201 is locked. FIG. 3 is a view when information processing device 100 is seen from front, and FIG. 4 is a view when information processing device 100 is seen obliquely from upper.

In recess 42 provided to second housing 120, projecting portions 221, 222 are provided on left and right sides. Projecting portions 221, 222 respectively have locking holes 221a, 222a. In FIGS. 3, 4, locking holes 221a, 222a are respectively provided on upper faces of projecting portions 221, 222. However, locking holes 221a, 222a are also respectively provided on opposite faces (lower faces) of projecting portions 221, 222. Providing locking holes 221a, 222a respectively on both of the faces of second unit 102 (a face disposed with display 121 and its opposite face) as described above allows second unit 102 to be attached to first unit 101 regardless of its orientation. In second housing 120, wall-shaped locking portions 42a, 42b are respectively provided on upper and lower sides of recess 42.

Figure 5:
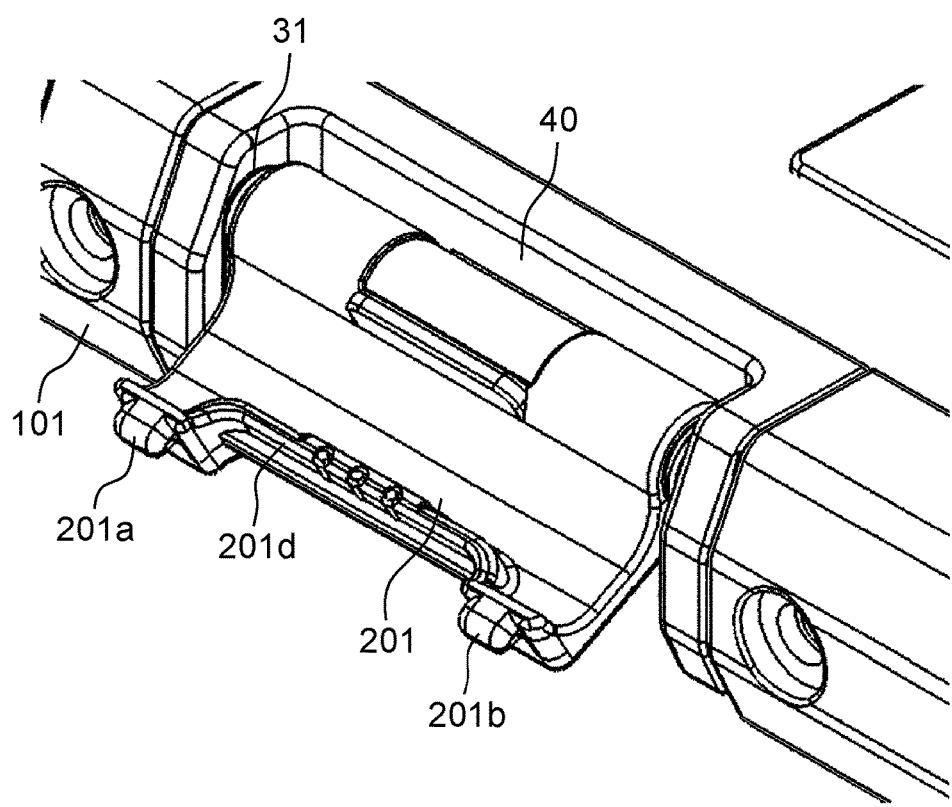
FIG. 5 is a perspective view of the latch.

FIG. 5 is a view illustrating a state where latch 201 is unlocked, thus latch 201 is released. Latch 201 is disposed in recess 40 provided on first housing 110 so as to be rotatable about a rotation shaft. At ends most distant from the rotation shaft, latch 201 is formed with projections 201a, 201b projecting toward a direction of a rotation radius. At an end most distant from the rotation shaft of latch 201, projecting portion 201d (a locking portion) projecting in a direction orthogonal to the direction of the rotation radius is provided.

Latch 201 is configured to fully be accommodated in recess 40 of first unit 101 when unlocked and fully open (rotated) downward. A rotation position (rotation angle) of latch 201 when fully accommodated in recess 40 of first unit 101 when latch 201 is unlocked and fully open (rotated) downward will be hereinafter referred to as a "first rotation position" or an "accommodated position." On the other hand, a rotation position (rotation angle) of latch 201 when latch 201 is locked will be hereinafter referred to as a "second rotation position" or a "locked position." In this exemplary embodiment, when the first rotation position is specified to have an angle of 0 degrees, the second rotation position has an angle of 180 degrees.

1-2-2. Lock Operation of Latching Mechanism

A lock operation of latch 201 will now be described herein with reference to FIGS. 6A to 6C. FIG. 6A illustrates latch 201 lying at the first rotation position when second unit 102 is closed with respect to first unit 101, in other words, latch 201 is unlocked. To lock latch 201 in this state, latch 201 is made to rotate until projections 201a, 201b at its tips abut projecting portions 221, 222 of second unit 102. After projections 201a, 201b of latch 201 first abut projecting portions 221, 222 of second unit 102, pushing latch 201 further toward second unit 102 causes projections 201a, 201b to slide on surfaces of projecting portions 221, 222 to move closer to locking holes 221a, 222a (see FIG. 6B). The rotation shaft of latch 201 is at this time biased upward by a biasing device (details will be described later). After projections 201a, 201b reach locking holes 221a, 222a of projecting portions 221, 222, the biasing device causes projections 201a, 201b to enter into locking holes 221a, 222a (see FIG. 6C). Latch 201 is therefore locked. A rotation position of latch 201 at this time is the second rotation position (the locked position).

While being locked, projections 201a, 201b of latch 201 entered into locking holes 221a, 222a provided on second unit 102 restrict a rotational motion of latch 201. In this state (see FIG. 6C), locking portion 42b lying at a lower side of second unit 102 lies below projecting portion 201d of latch 201 (i.e., locking portion 42b lies between projecting portion 201d and the rotation shaft of latch 201). To open second unit 102 from this state, projecting portion 201d needs to be moved so that locking portion 42b of second unit 102 is not restricted by projecting portion 201d of latch 201. While being locked, however, a rotational motion of latch 201 is restricted, and thus projecting portion 201d of latch 201 cannot be moved. Second unit 102 cannot therefore be open, and thus second unit 102 is held in a closed state.

Figure 7A:
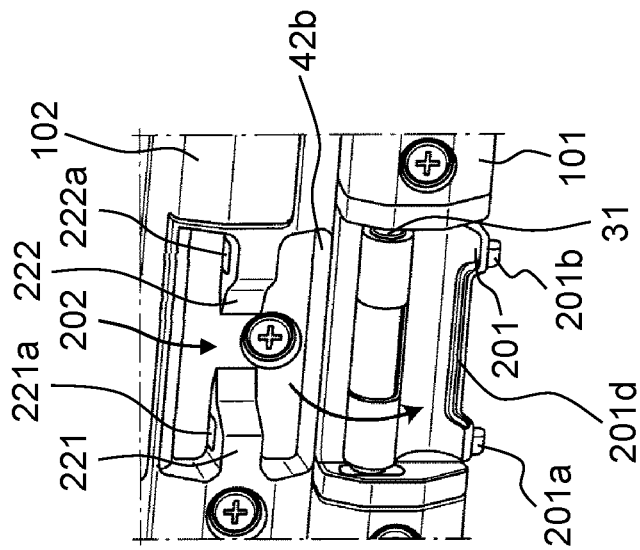
FIG. 7A is a view illustrating an operation of the latching mechanism when the latch is to be unlocked.
Figure 7B:
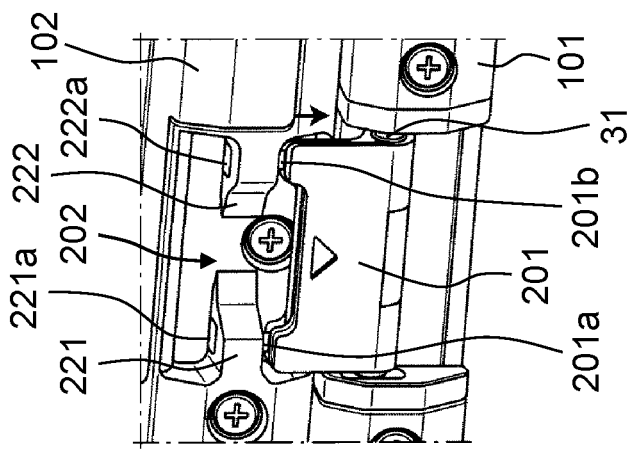
FIG. 7B is view illustrating the operation of the latching mechanism when the latch is to be unlocked.
Figure 7C:
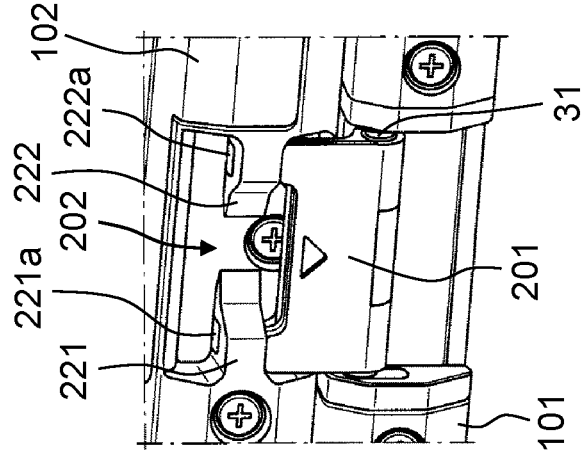
FIG. 7C is a view illustrating the operation of the latching mechanism when the latch is to be unlocked.

An unlocking operation of latch 201 will now be described herein with reference to FIGS. 7A to 7C. FIG. 7A is a view illustrating latch 201 being locked. In this state, latch 201 is moved downward against a biasing force of the biasing device (described later) (see FIG. 7B) to allow projections 201a, 201b to come out of locking holes 221a, 222a. After projections 201a, 201b came out of locking holes 221a, 222a, latch 201 rotates (opens) downward by its weight (see FIG. 7C). Projecting portion 201d of latch 201 therefore moves, which frees locking portion 42b of second unit 102, and thus second unit 102 can open. In other words, unlocking is taken place. As described above, the latching mechanism according to this exemplary embodiment can achieve locking and unlocking of the latch with a simple operation.

1-2-3. Lock Mechanism

An internal configuration of the latching mechanism for achieving locking and unlocking of latch 201 described above will now be described herein.

Figure 8:
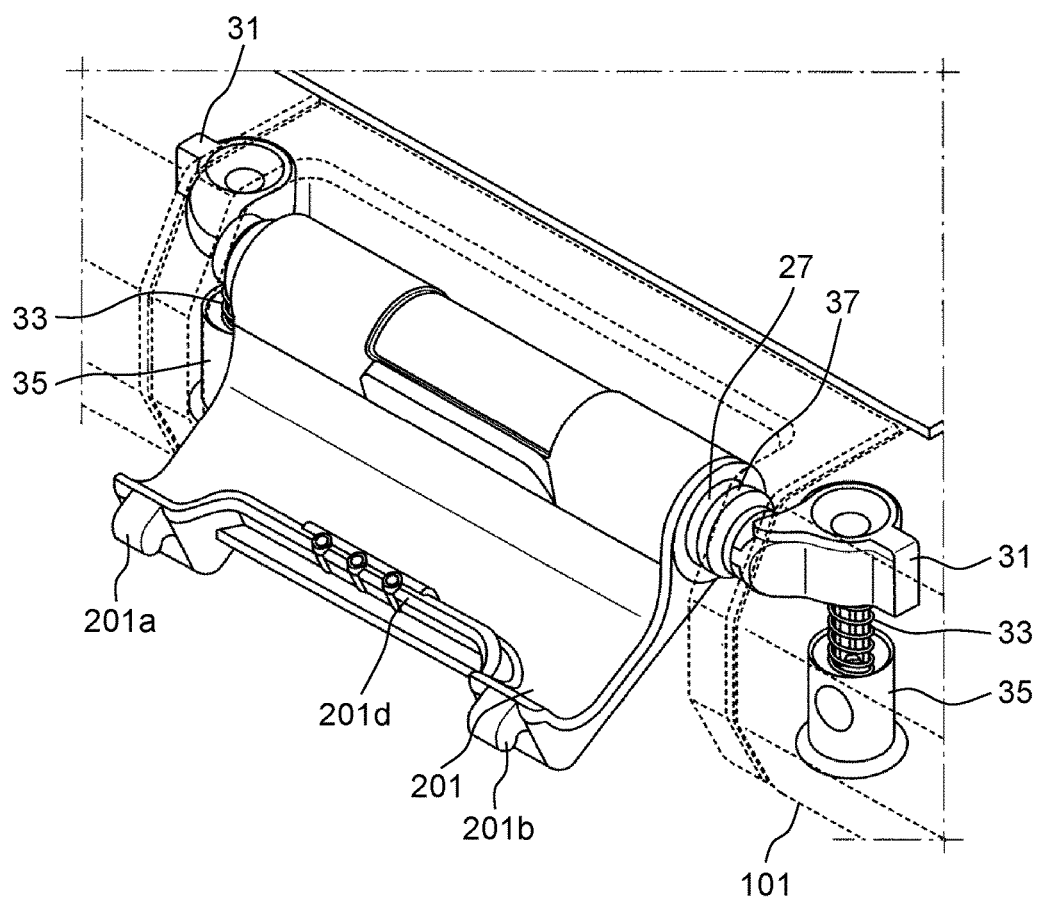
FIG. 8 is a view illustrating an internal configuration of the latching mechanism.
Figure 9:
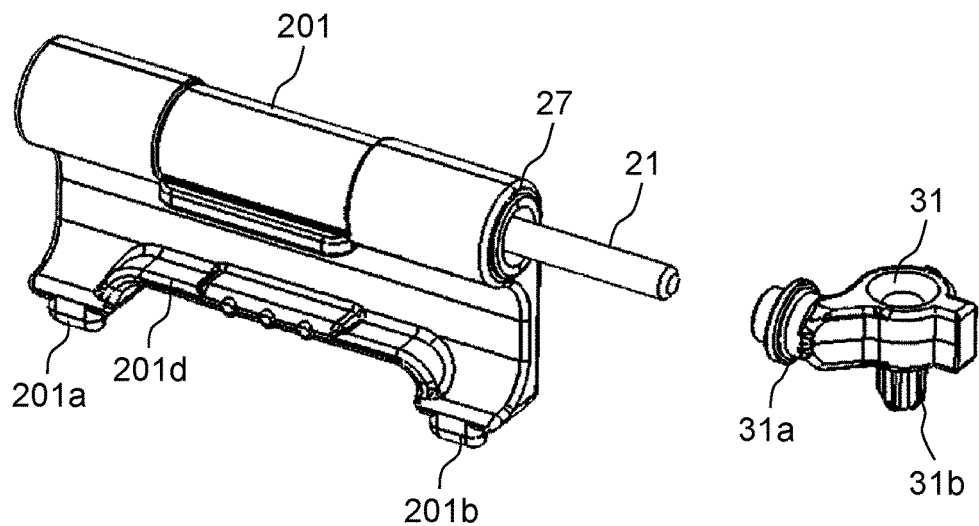
FIG. 9 is a view illustrating the latch, a shaft, and a rotation shaft support.
Figure 10:
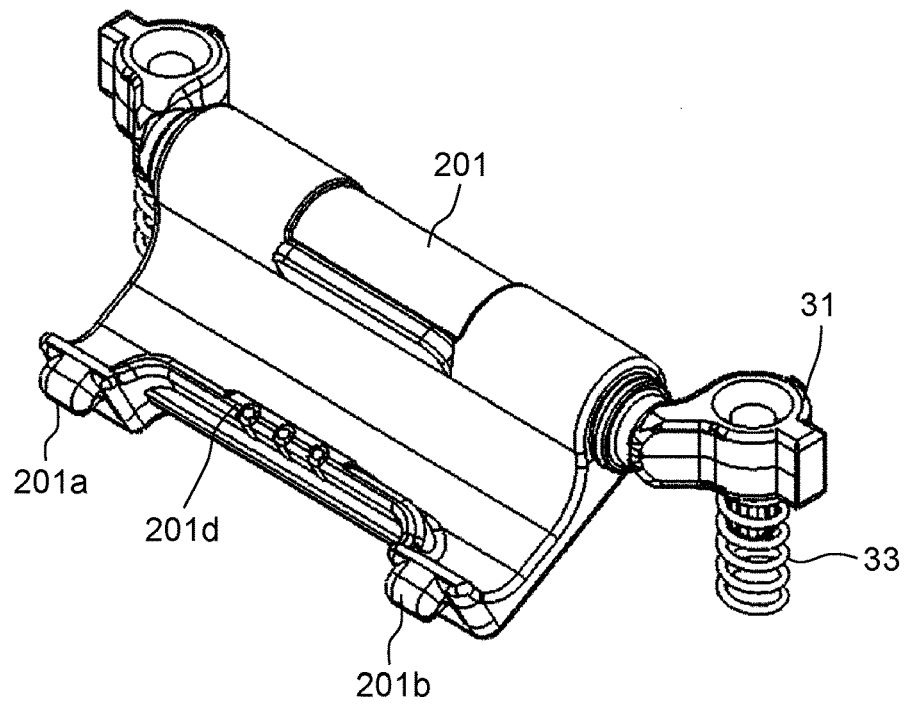
FIG. 10 is a view illustrating the latch, the rotation shaft support, and a spring (a biasing member)
Figure 11:
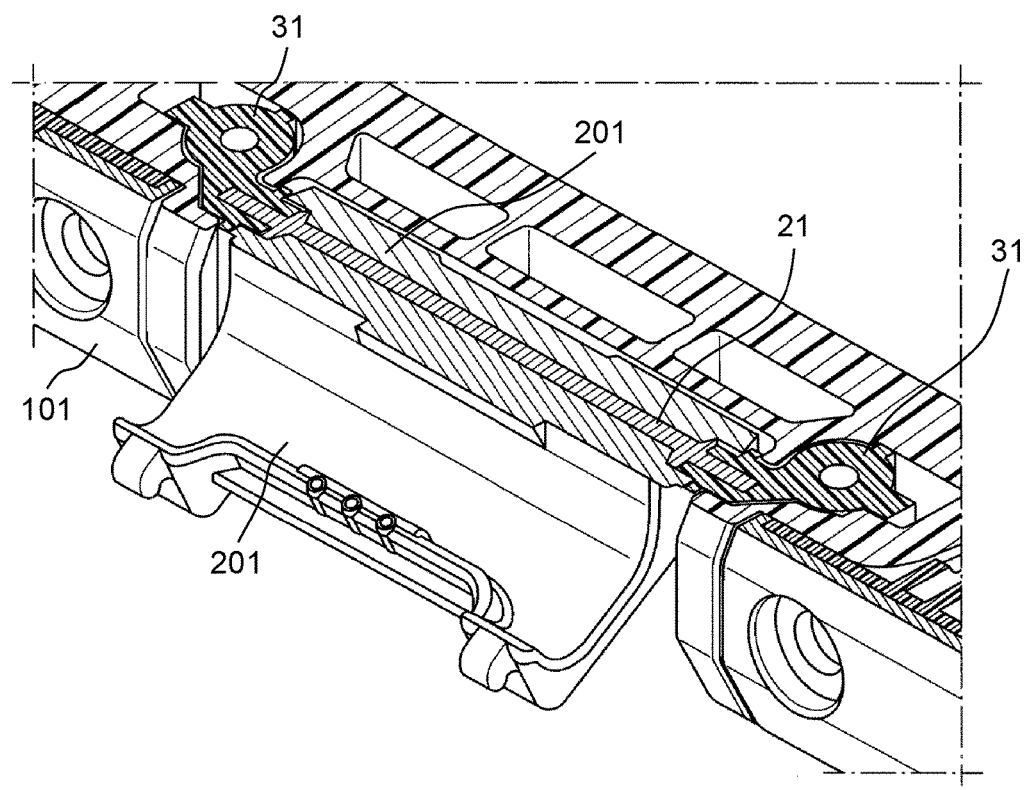
FIG. 11 is a cross-sectional view (horizontal cross-sectional view) for describing a configuration of the latching mechanism.
Figure 12:
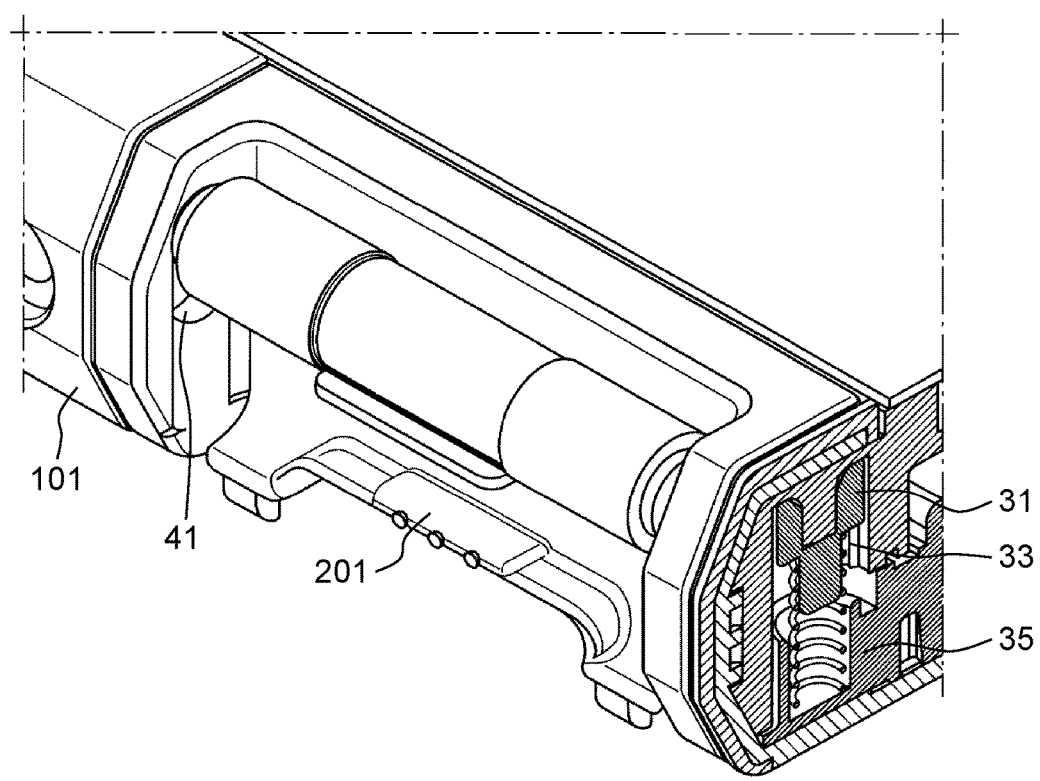
FIG. 12 is a cross-sectional view (vertical cross-sectional view) for describing the configuration of the latching mechanism.

FIG. 8 is a view illustrating the internal configuration of the latching mechanism. FIGS. 9, 10 are views illustrating components around latch 201. FIG. 11 is a cross-sectional view (horizontal cross-sectional view) for describing components for achieving a rotational motion of latch 201. FIG. 12 is a cross-sectional view (vertical cross-sectional view) for describing components for achieving a movement of latch 201 in a vertical direction.

As shown in FIG. 8, in first unit 101, rotation shaft supports 31, springs 33 (example of biasing devices), and spring supports 35 are respectively disposed on both sides of latch 201. Rotation shaft supports 31 are formed of a resin, for example. As shown in FIGS. 9, 11, shaft 21 passes through latch 201, and is supported by rotation shaft supports 31 at both ends of latch 201. Latch 201 can therefore rotate about shaft 21 served as a rotation axis. A bore of a through opening of latch 201, into which shaft 21 passes through, is set to a value greater than a value of a diameter of shaft 21 so that friction of rotation shaft on shaft 21 lowers. Latch 201 therefore opens (rotates) downward by its weight when unlocked.

As shown in FIG. 9, rotation shaft supports 31 respectively have shaft holders 31a and spring attachments 31b. Shaft holders 31a hold shaft 21. As shown in FIGS. 10, 12, spring attachments 31b are respectively attached with springs 33 for biasing rotation shaft supports 31 in a predetermined direction (a direction from springs 33 to rotation shaft supports 31). Springs 33 are held by spring supports 35 formed on first housing 110.

As will be described later, rotation shaft supports 31 are movable in a predetermined direction or its opposite direction. Positions of rotation shaft supports 31, at which rotation shaft supports 31 are most distant from latch receiver 202 of second unit 102 when second unit 102 is closed, will be hereinafter each referred to as a "first position." On the other hand, positions that rotation shaft supports 31 can take when latch 201 is locked will be hereinafter each referred to as a "second position." In other words, latch 201 is at least rotatable from the first rotation position to the second rotation position, and rotation shaft supports 31 are at least movable from the first position to the second position.

Figure 13:
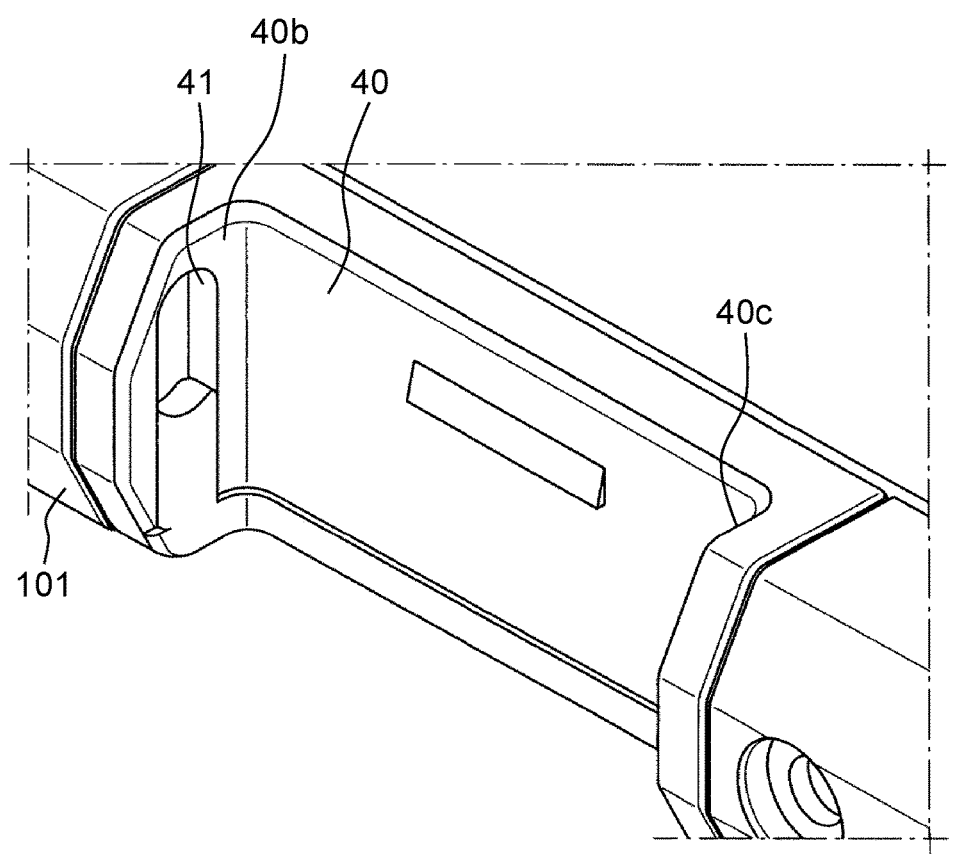
FIG. 13 is a view illustrating a recess for accommodating the latch in the first unit.
Figure 14:
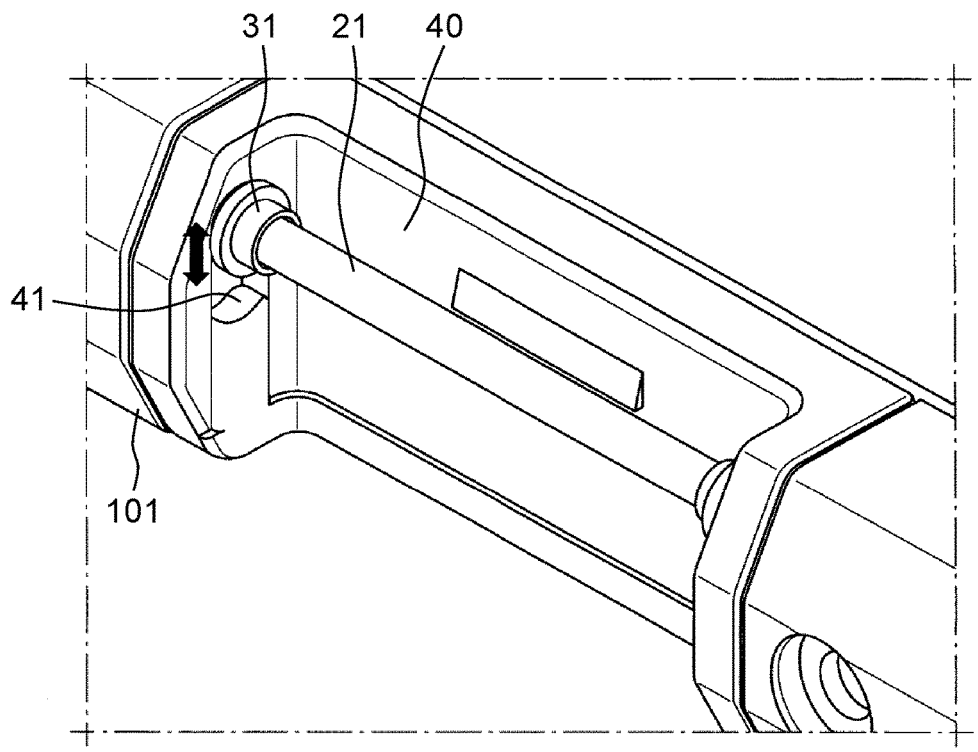
FIG. 14 is a view illustrating a connection state of the shaft and the rotation shaft supports in the first unit.

FIG. 13 is a view illustrating, in first unit 101, recess 40 for accommodating latch 201. Left and right walls 40b, 40c of recess 40 are respectively formed with grooves 41 in the vertical direction. FIG. 14 is a view illustrating rotation shaft supports 31 inserted into grooves 41 and shaft 21 connected to rotation shaft supports 31. Rotation shaft supports 31 can move vertically in grooves 41 with a force that presses downward latch 201 or biasing forces of springs 33. Springs 33 each have at least a biasing force that can move rotation shaft supports 31 to the second position so that, when latch 201 is locked, projections 201a, 201b of latch 201 can enter into locking holes 221a, 222a of second unit 102.

Figure 15:
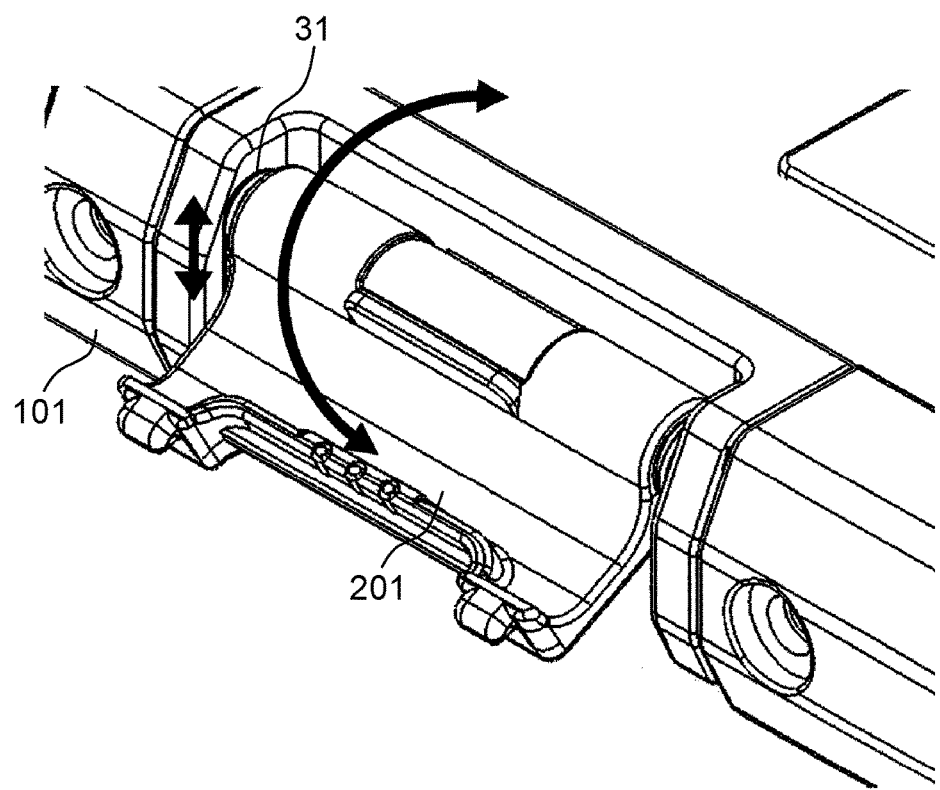
FIG. 15 is a view for describing a movement of the latch.

By configuring the latching mechanism as described above, as shown in FIG. 15, latch 201 can rotate about the rotation shaft (shaft 21), as well as the rotation shaft can move vertically. With a rotation and a vertical movement of latch 201 as described above, latch 201 can be simply locked and unlocked as described in FIGS. 6, 7. Latch 201 can serve as a single component provided on an exterior of the main body as a latching mechanism, which achieves a simpler, smaller configuration. The latching mechanism according to this exemplary embodiment can therefore be mounted on a thinner device.

1-2-4. Rotation Restriction Structure

A rotation restriction structure of latch 201 will now be described herein with reference to FIGS. 16 to 19. As described above, latch 201 can freely rotate about shaft 21 served as a rotation axis when unlocked. If information processing device 100 is used in an environment subject to vibration, such as a moving vehicle, latch 201 therefore vibrates and generates a noise. To prevent such problems, this exemplary embodiment has taken a measure so that latch 201 does not vibrate when latch 201 is unlocked.

Figure 16:
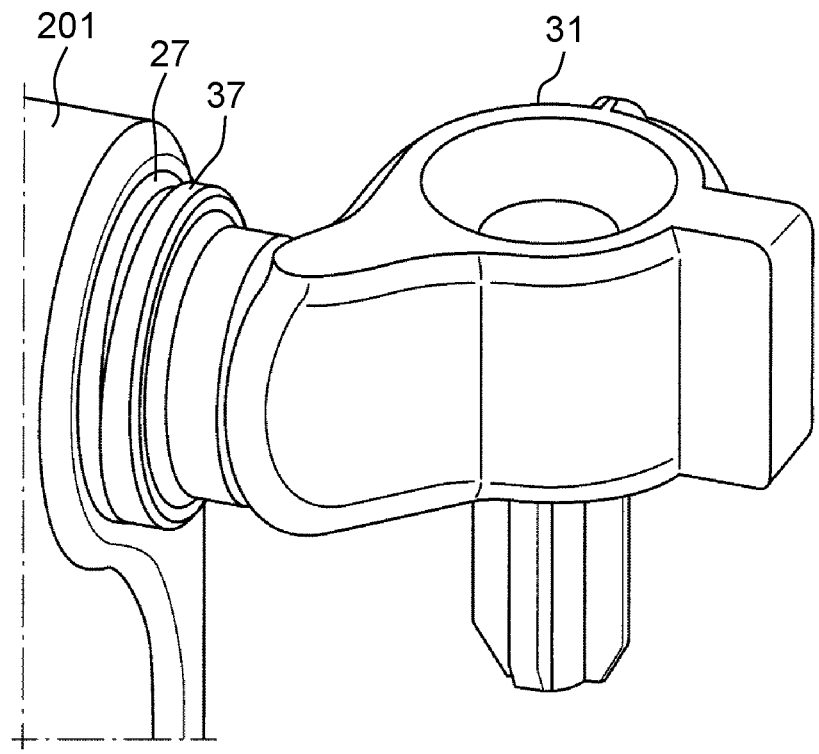
FIG. 16 is a view for describing ring portions provided on the latch and the rotation shaft support (a shaft holder) so as to restrict the latch from rotating.

FIG. 16 is a view for describing a configuration for restricting latch 201 from rotating. To restrict latch 201 from rotating, latch 201 is provided with ring portions 27 each having a ring shape and disposed on an axis identical to an axis of rotation shaft 21. Shaft holders 31a of rotation shaft supports 31 are respectively provided with ring portions 37 each having a ring shape and disposed on an axis identical to the axis of rotation shaft 21.

Figure 17:
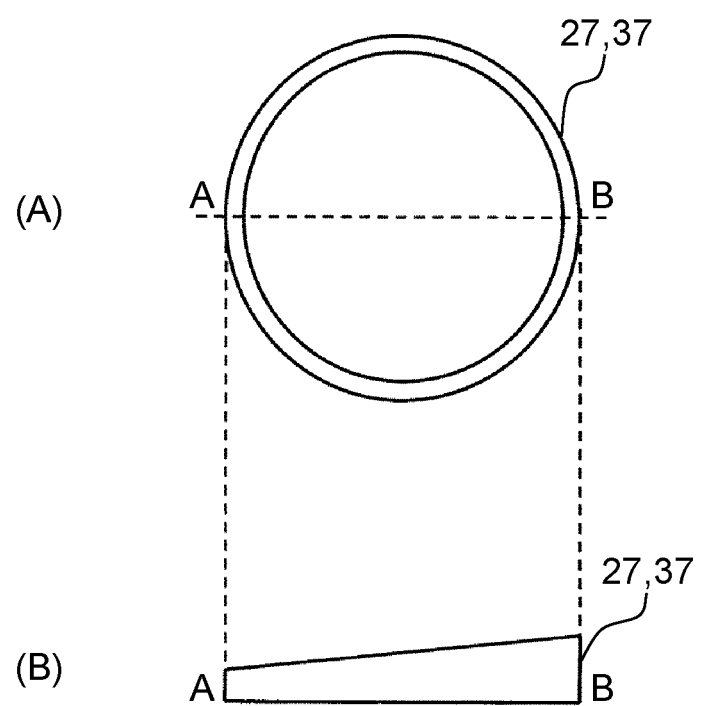
FIG. 17 is a view illustrating a structural feature of the ring portion.

FIG. 17 is a view illustrating a structural feature of ring portions 27, 37. Part (A) of FIG. 17 is a top view of ring portions 27, 37, and part (B) of FIG. 17 is a side view of ring portions 27, 37. For example, as shown in part (B) of FIG. 17, ring portions 27, 37 are each formed so as to continuously change in height (i.e., so as to incline) in a height direction. Specifically, ring portions 27, 37 are each formed so that each height becomes maximum at position B, as well as each height becomes minimum at position A lying symmetrical to position B with respect to a center of each ring.

Figure 18:
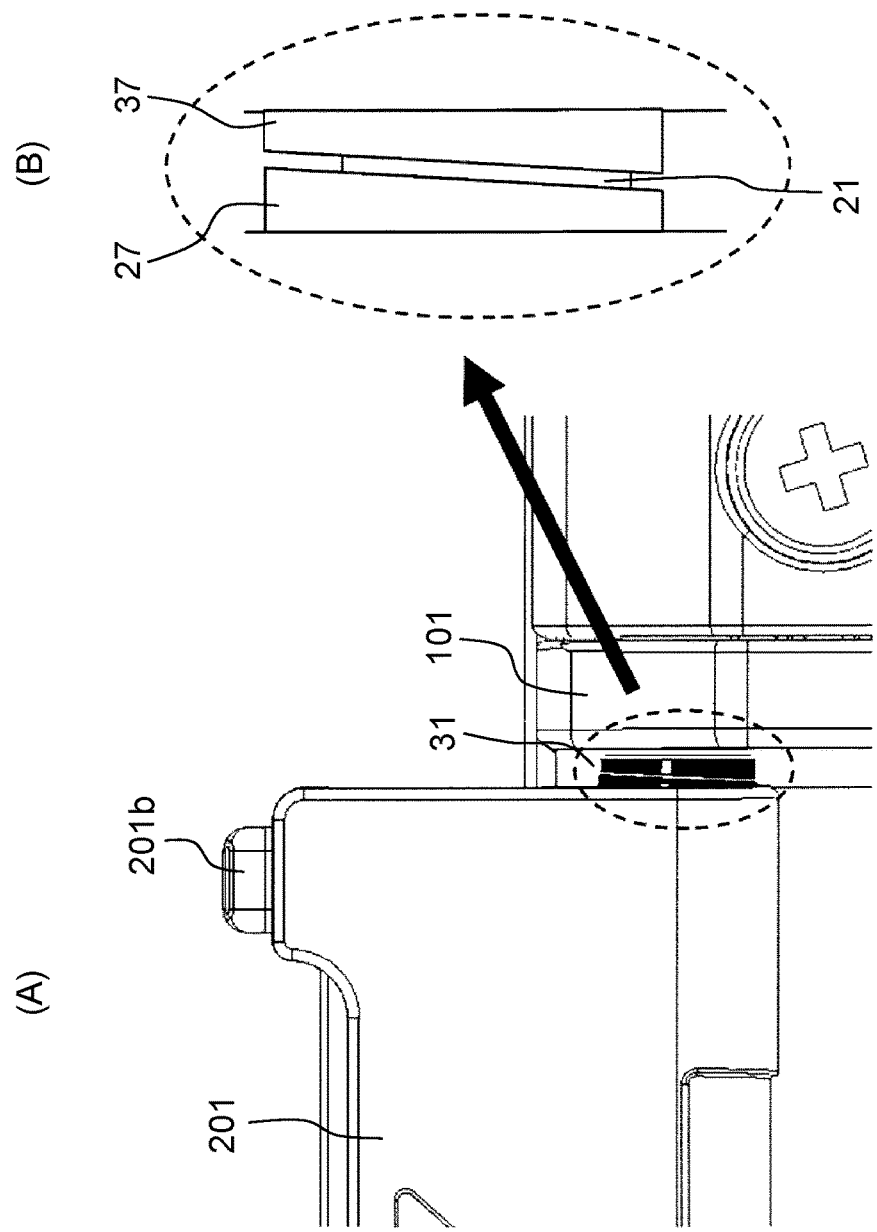
FIG. 18 is a view illustrating a state of the two ring portions when the latch is closed.
Figure 19:
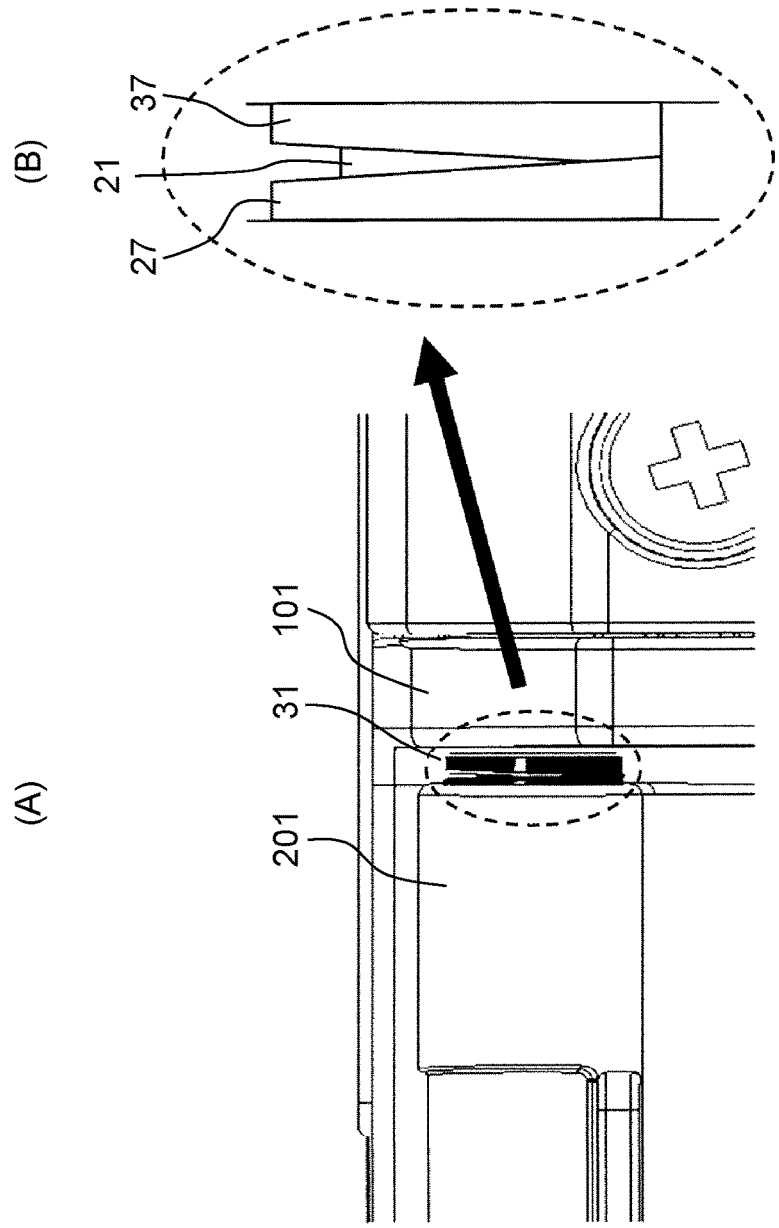
FIG. 19 is a view illustrating a state of the two ring portions when the latch is open.

FIG. 18 is a view illustrating a state of ring portions 27, 37 on latch 201 and each of rotation shaft supports 31 when latch 201 lies at the second rotation position (the locked position). FIG. 19 is a view illustrating a state of two ring portions 27, 37 when latch 201 lies at the first rotation position (the accommodated position). As shown in these views, a height of each of ring portions 27 of the latch and a height of each of ring portions 37 of the rotation shaft supports are set so that, as latch 201 rotates from the second rotation position (the locked position) to the first rotation position (the accommodated position), an area at which ring portion 27 abut respectively on ring portions 37 increases.

Specifically, as shown in FIG. 18, ring portions 27, 37 are respectively formed so that, when latch 201 lies at the second rotation position (the locked position), a higher portion of each of ring portions 27 and a lower portion of each of ring portions 37 of rotation shaft supports 31 face each other, while a lower portion of each of ring portions 27 and a higher portion of each of ring portions 37 face each other. As shown in part (B) of FIG. 18, a gap is formed at this time between each of ring portions 27 of latch 201 and each of ring portions 37 of rotation shaft supports 31, and thus latch 201 can rotate without being interfered by ring portions 27, 37.

By forming ring portions 27, 37 as described above, when latch 201 is rotated to the first rotation position (the accommodated position), the higher portion of each of ring portions 27 and the higher portion of each of ring portions 37 of rotation shaft supports 31 face each other (see FIG. 19). As shown in part (B) of FIG. 19, the higher portion of each of ring portions 27 of latch 201 and the higher portion of each of ring portions 37 of rotation shaft supports 31 at this time abut (interfere) each other. Friction generated due to this abutting (interference) restricts latch 201 from rotating, and thus latch 201 is fixed to the first rotation position (the accommodated position).

With ring portions 27, 37 as described above, latch 201 can freely be rotated when locking the latch. On the other hand, when unlocking the latch, latch 201 can be fixed to the accommodated position to prevent as much as possible the latch from vibrating. In other words, latch 201 can be prevented as much as possible from vibrating without using a special anti-vibration cushion or spring, noise to be generated due to vibration can be reduced, and thus a simpler, smaller configuration can be achieved.

Shapes of ring portions 27, 37 are not limited to structures shown in FIG. 17. Ring portions 27, 37 may each have a structure including a relatively higher portion and a relatively lower portion. The shapes (the heights) of ring portions 27, 37 may be adjusted so that, when latch 201 lies at or around the second rotation position (the locked position), the relatively higher portion (or a lower portion) of each of ring portions 27 of latch 201 and the relatively lower portion (or a higher portion) of each of ring portions 37 of rotation shaft supports 31 face each other, and, when latch 201 lies at the first rotation position (the accommodated position), the relatively higher portions of ring portions 27, 37 face and abut each other.

Figure 20:
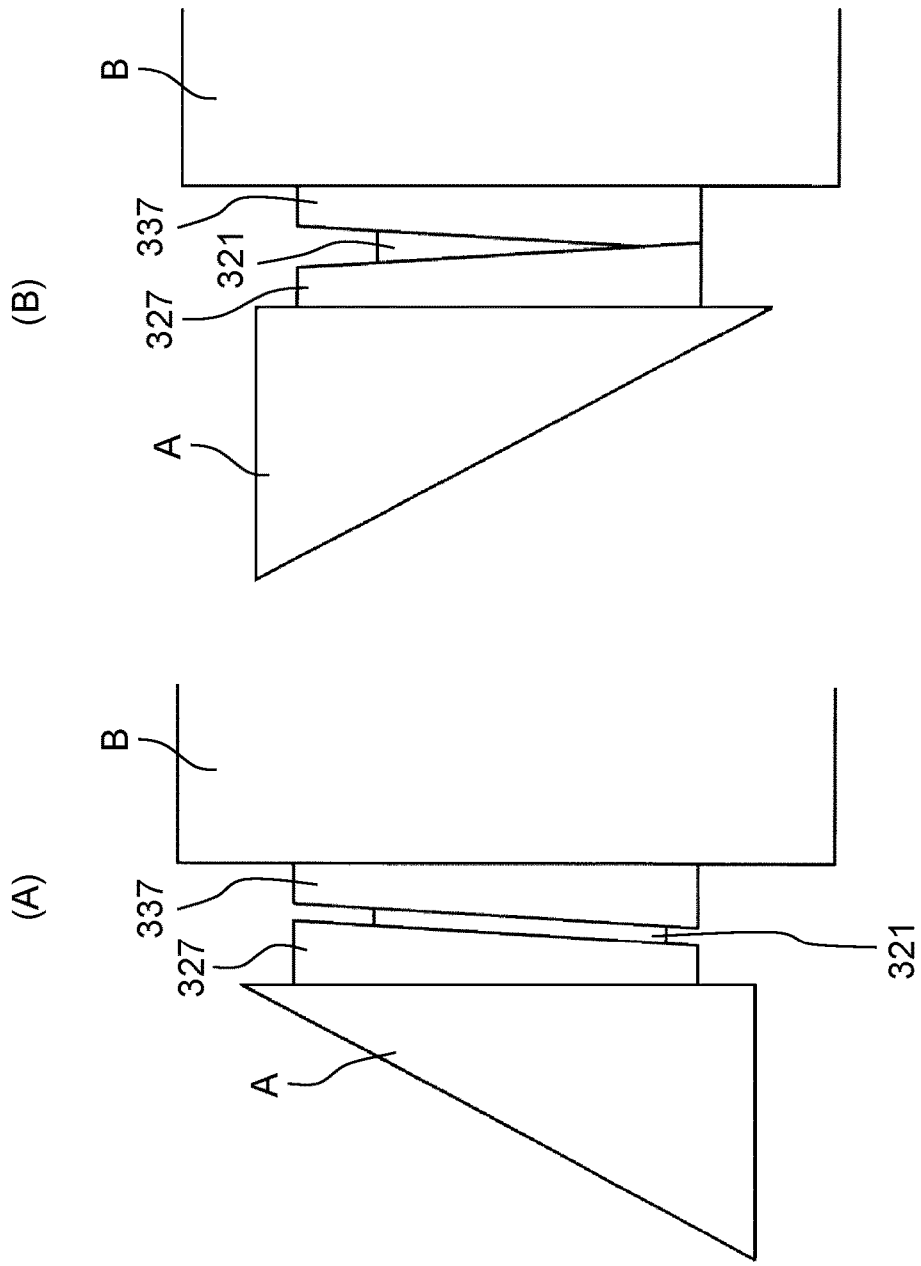
FIG. 20 is a view illustrating an ordinary application of the ring portions for restricting rotation.

The above described ring-shaped rotation restriction structure is applicable to not only a latching mechanism, but also other rotation mechanisms. In other words, as shown in FIG. 20, when member A and member B are rotatably coupled, member A and member B may respectively be formed with ring portions 327, 337 disposed on an axis identical to an axis of rotation shaft 321 and are inclined in a height direction. In this case, as shown in part (B) of FIG. 20, heights of relatively higher portions of ring portions 327, 337 may be adjusted so that, at a rotation position at which rotation needs to be restricted, the relatively higher portions of ring portions 327, 337 face each other.

1-3. Effects and Other Benefits

As described above, information processing device 100 according to this exemplary embodiment is an electronic device including first unit 101, second unit 102 openable with respect to first unit 101, and a latching mechanism (202, 201) for fixing second unit 102 in a closed state with respect to first unit 101. The latching mechanism includes latch 201 that is provided to first unit 101, that is provided with projections 201a, 201b (an example of first engaging portions) at a tip of the latch, and that is rotatable about shaft 21 (an example of rotation shaft) from a first rotation position to a second rotation position, rotation shaft supports 31 that are provided to first unit 101, that rotatably support shaft 21, and that are movable between a first position and a second position, springs 33 (an example of biasing portions) that are provided to first unit 101, and that bias rotation shaft supports 31 in a direction from the first position to the second position, and locking holes 221a, 222a (an example of second engaging portions) that are provided to second unit 102, and that are engageable with projections 201a, 201b. Projections 201a, 201b and locking holes 221a, 222a engage when second unit 102 is closed with respect to first unit 101, rotation shaft supports 31 lie at the second position, and latch 201 lies at the second rotation position.

The latching mechanism as described above allows locking and unlocking of the latch by simply performing an operation with a rotation and a vertical movement. Since components provided on the exterior of the main body can also be reduced in number, such a latching mechanism can be applied to a thinner electronic device.

In information processing device 100, latch 201 may include projecting portion 201d (an example of first locking portion), and second unit 102 (second housing 120) may include locking portion 42b (an example of second locking portion). Locking portion 42b lies between projecting portion 201d and the rotation shaft (shaft 21) when second unit 102 is closed with respect to first unit 101, and latch 201 lies at the second rotation position (i.e., when locked). Such a positional relationship between projecting portion 201d and locking portion 42b when locked prevents second unit 102 from opening with respect to first unit 101 when latch 201 is locked.

A latching mechanism according to another aspect of this exemplary embodiment, which is to be mounted on information processing device 100, includes latch 201 that is rotatable about a rotation shaft (shaft 21) between an accommodated position and a locked position, and that fixes, at the locked position, first unit 101 and second unit 102 in a closed state, and rotation shaft supports 31 rotatably supporting the rotation shaft. Latch 201 has first ring portions 27 each having a ring shape and disposed on an axis identical to an axis of the rotation shaft. Rotation shaft supports 31 respectively having second ring portions 37 each having a ring shape and disposed on an axis identical to the axis of the rotation shaft (shaft 21). Heights of the first ring portions and the second ring portions are set so that, as the latch rotates from the locked position to the accommodated position, an area at which first ring portions 27 abut respectively on second ring portions 37 increases.

With the ring portions as described above, latch 201 can be fixed when unlocked, and thus the latch can be prevented as much as possible from vibrating. In other words, latch 201 can be prevented as much as possible from vibrating without using a special anti-vibration cushion or spring, noise to be generated due to vibration can be reduced, and thus a simpler, smaller configuration can be achieved.

Other Exemplary Embodiments

As above, the first exemplary embodiment has been described as illustration of the technique disclosed in the present application. However, the technique of the present disclosure is not limited to the first exemplary embodiment, but is applicable to another exemplary embodiment in which a change, a replacement, an addition, or an omission is appropriately made. A new exemplary embodiment can also be made by a combination of the components of the first exemplary embodiment. Accordingly, another exemplary embodiment will be described below.

In the first exemplary embodiment, latch 201 has been provided on first unit 101 including the input portions. However, latch 201 may be provided on second unit 102 including the display.

In the first exemplary embodiment, the coil springs have been used as the devices for biasing rotation shaft supports 31. However, a biasing device is not limited to a coil spring. As a biasing device, a torsion spring or a leaf spring, or an elastic member, instead of a spring, may be used, for example.

The shapes of the projections, the projecting portions, the locking portions, the locking holes, and other components shown in the first exemplary embodiment are merely examples, and the shapes are not limited to the above described shapes. As long as a similar or identical function can be achieved, the projections, the projecting portions, and other components may each have another shape.

In the first exemplary embodiment, a so-called detachable computer has been described as an example electronic device. However, the idea of the present disclosure is applicable to other types of electronic devices. For example, the present disclosure is applicable to electronic devices each including openable units, such as laptop personal computers, word processors, and electronic dictionaries.

The exemplary embodiments have been described above and exemplified as the technique of the present disclosure. The accompanying drawings and detailed description have been provided for this purpose.

Accordingly, the components described in the appended drawings and the detailed description include, in order to exemplifying the above described technique, not only essential components, but also components that are not essential. Therefore, it should not be immediately construed that these components that are not essential are essential even if the components are described in the appended drawings and the detailed description.

Since the above described exemplary embodiments are for exemplifying the technique of the present disclosure, various modifications, replacements, additions, and omissions can be made within the scope of the appended claims or of their equivalents.

The present disclosure is useful for electronic devices including openable units, such as laptop personal computers, word processors, and electronic dictionaries.

What is claimed is:

1. An electronic device comprising:
   a first unit having a recess on a front end of the first unit;
   a second unit openable with respect to the first unit; and
   a latching mechanism for fixing the second unit in a closed state with respect to the first unit, the latching mechanism including:
      a latch provided to the recess of the first unit, the latch being provided with a first engaging portion at a tip of the latch, the latch being rotatable about a rotation shaft from a first rotation position to a second rotation position, the rotation shaft being substantially parallel to the front end of the first unit;
      a shaft support provided to the first unit, the shaft support rotatably supporting the rotation shaft, the shaft support being movable between a first position and a second position;
      a biasing portion provided to the first unit, the biasing portion biasing both ends of the rotation shaft in a direction from the first position to the second position; and
      a second engaging portion provided to the second unit, the second engaging portion being engageable with the first engaging portion,
   wherein the first and second engaging portions engage with each other when the second unit is closed with respect to the first unit, the shaft support lies at the second position, and the latch lies at the second rotation position.

2. The electronic device according to claim 1, wherein the first engaging portion is a projection, and the second engaging portion is a hole into which the projection can be inserted.

3. The electronic device according to claim 1, wherein the latch includes a first locking portion, and the second unit includes a second locking portion,
   the second locking portion lying between the first locking portion and the rotation shaft when the second unit is closed with respect to the first unit, and the latch lies at the second rotation position.

4. The electronic device according to claim 1, wherein the first unit includes an input portion, and the second unit includes a display.

5. The electronic device according to claim 4, wherein the electronic device is one of a laptop personal computer, a detachable computer, a word processor, and an electronic dictionary.

6. A latching mechanism used in a device including (i) a first unit having a recess on a front end of the first unit and (ii) a second unit openable with respect to the first unit, the latching mechanism fixing the second unit in a closed state with respect to the first unit, the latching mechanism comprising:
   a latch provided to the recess of the first unit, the latch being provided with a first engaging portion at a tip of the latch, the latch being rotatable about a rotation shaft from a first rotation position to a second rotation position, the rotation shaft being substantially parallel to the front end of the first unit;
   a shaft support provided to the first unit, the shaft support rotatably supporting the rotation shaft, the shaft support being movable between a first position and a second position;
   a biasing portion provided to the first unit, the biasing portion biasing both ends of the rotation shaft in a direction from the first position to the second position; and
   a second engaging portion provided to the second unit, the second engaging portion being engageable with the first engaging portion, wherein the first engaging portion and the second engaging portion engage with each other when the second unit is closed with respect to the first unit, the shaft support lies at the second position, and the latch lies at the second rotation position.

7. The electronic device according to claim 1, wherein the biasing portion includes a first resilient member and a second resilient member, wherein the first resilient member biases one of the ends of the rotation shaft in the direction and the second resilient member biases the other of the ends of the rotation shaft in the direction.

8. The latching mechanism used in a device according to claim 6, wherein the biasing portion includes a first resilient member and a second resilient member, wherein the first resilient member biases one of the ends of the rotation shaft in the direction and the second resilient member biases the other of the ends of the rotation shaft in the direction.

* * * * *